(12) United States Patent
Rice

(10) Patent No.: US 10,810,657 B2
(45) Date of Patent: Oct. 20, 2020

(54) SYSTEM AND METHOD ADAPTED TO FACILITATE SALE OF DIGITAL IMAGES WHILE PREVENTING THEFT THEREOF

(71) Applicant: Waldo Photos, Inc., Boerne, TX (US)

(72) Inventor: Rodney Rice, Boerne, NY (US)

(73) Assignee: Waldo Photos, Inc., Boerne, TX (US)

( * ) Notice: Subject to any disclaimer, the term of this patent is extended or adjusted under 35 U.S.C. 154(b) by 322 days.

(21) Appl. No.: 15/883,082

(22) Filed: Jan. 29, 2018

(65) Prior Publication Data

US 2019/0087889 A1    Mar. 21, 2019

Related U.S. Application Data

(60) Provisional application No. 62/558,988, filed on Sep. 15, 2017.

(51) Int. Cl.
*G06Q 30/00* (2012.01)
*G06Q 30/06* (2012.01)
(Continued)

(52) U.S. Cl.
CPC ......... *G06Q 30/0643* (2013.01); *G06F 21/10* (2013.01); *G06F 21/6218* (2013.01); *G06K 9/00288* (2013.01); *G06K 9/00677* (2013.01); *G06T 5/20* (2013.01); *G06T 5/50* (2013.01); *G06F 2221/2141* (2013.01); *G06T 2207/20221* (2013.01); *H04L 67/02* (2013.01)

(58) Field of Classification Search
CPC ................ G06Q 30/0601–0645; H04N 1/448
USPC ................................................ 705/26.1–27.2
See application file for complete search history.

(56) References Cited

U.S. PATENT DOCUMENTS 9,779,531 B1 *  10/2017  Kumar ............... G06F 21/6245
                                                              713/189
2004/0001220 A1 *  1/2004  Gorday ............. H04N 1/00838
                                                                358/1.15
(Continued)

OTHER PUBLICATIONS

Alexander, James Michael. "MASKS: Maintaining Anonymity by Sequestering Key Statistics." Order No. 3363242 University of Pennsylvania, 2009. Ann Arbor: ProQuest. Web. Jul. 20, 2020 (Year: 2009).*

*Primary Examiner* — Resha Desai
*Assistant Examiner* — Kennedy Gibson-Wynn
(74) *Attorney, Agent, or Firm* — Steven A. Wood, Esq.

(57) ABSTRACT

The present invention facilitates secure display and sale of copyright protected images, by showing alternate reciprocal images, with complementary obstructed/degraded and clearly visible areas. System components include server machines and/or computer terminals with a screen or other display mechanism. The system may be connected through a communications network or it may be self-contained on a stand-alone, specialized computer system. System components further include non-transitory computer-readable media containing a database of images. The system creates and displays alternate reciprocal images showing blockades covering faces, patterns or objects of interest in a first image and showing the same faces, patterns or objects shown as clearly visible with all surroundings having degraded resolution or blur. Users are provided an opportunity to purchase the image and a clean copy of the image is delivered to the user upon completion of a purchase transaction.

10 Claims, 15 Drawing Sheets

(51) Int. Cl.
*G06K 9/00* (2006.01)
*G06T 5/20* (2006.01)
*G06F 21/62* (2013.01)
*G06T 5/50* (2006.01)
*G06F 21/10* (2013.01)
*H04L 29/08* (2006.01)

(56) References Cited

U.S. PATENT DOCUMENTS

2009/0142001 A1* 6/2009 Kuniyuki ........... G06K 9/00228
 382/284
2015/0009248 A1* 1/2015 Bracalente ......... G06Q 30/0635
2016/0307042 A1* 10/2016 Martin ............... G06K 9/00724
2016/0335746 A1* 11/2016 Loke ....................... G06F 21/84

* cited by examiner

SYSTEM AND METHOD ADAPTED TO FACILITATE SALE OF DIGITAL IMAGES WHILE PREVENTING THEFT THEREOF

CROSS REFERENCE TO RELATED U.S. PATENT APPLICATIONS

This application is a non-provisional of, and claims the benefit under 35 U.S.C. § 119(e) of the earlier filing date of U.S. Provisional Application Ser. No. 62/558,988, filed on Sep. 15, 2017, which is hereby incorporated in entirety by reference.

BACKGROUND

1. Field of the Invention

The present invention generally relates to a system, potentially implemented remotely over a communications network, enabling users of the system ("Users") to view and purchase photographs and videos ("Images"), including digital Images as well as physical prints and products.

2. Description of Related Art

As a commercial field, professional photography has evolved to include multiple market segments. Collectively, the field of professional photography depends on the photographer's ability to enforce copyright in their images, because if the images were made freely available to the public, the customers would have no incentive to obtain the images from the photographer. And, different market segments have developed divergent mechanisms for enforcing copyright.

However, so far, no effective solution has been developed to prevent potential customers from using without authorization Images provided to the client with the intent that they be used solely for evaluation purposes.

Controlling a copyright protected image is an understandable goal for any photographer attempting to make a living through their photography. It is important to commercialization of the content created, as well as protecting the photographer's brand. Seeing one's own proprietary work altered without permission or discovering it located on blogs or social media without any credit can be very frustrating.

And so, in the sea change to digital photography, professional photographers have found it more difficult to protect the intellectual property in their proprietary Images. Many photographers attempt to prevent these occurrences by watermarking their images 20, ensuring that their logo 22 or website 24 is included on every image 20 that is uploaded to the internet (see FIGS. 1, 2 & 3).

Another typical method of attempting to prevent unauthorized use of proprietary Images is to provide only low-resolution versions of the content for customer viewing prior to purchase. The primary reason for watermarking a copyright protected Image or providing a low resolution or blurred version of a copyright protected Image is to prevent theft. However, traditional watermarks and low-resolution versions are not necessarily the best way to protect proprietary Images.

For instance, watermarks can negatively impact the viewing experience and low-resolution versions can make it difficult for customers to determine whether or not the image will satisfy their needs. Impeding a viewer's ability to fully assess an Image through watermarks 20 or low-resolution images can disrupt the viewing experience and ultimately contribute to a decision to forego purchase of the Image.

And, although watermarks will prevent theft in some cases, determined thieves are often able to find a way. Many photographers watermark every Image that is delivered to their clients, not pertaining to low-resolution proofs, and charge a fee if the client wants to have a watermark-free version of the Image. Examples of typical watermarked Images can be found in FIGS. 1-3.

Additionally, without proper placement of a watermark, it may be cropped out of the desired portion of the Image. Another typical tactic for photographers that want to prevent theft of their proprietary work is to provide only low-resolution version of their Images online.

The primary drawback to this approach is that Image quality may be lacking, especially on devices that support high definition (HD) display. Low resolution Images also fail to defend against uncredited Tumblr or Pinterest reposts, so this tactic is primarily useful for preventing unauthorized reselling of proprietary work.

Other conventional ways to protect proprietary Images include manually tracking misuse of copyright protected Images or engaging service providers to do so on one's behalf. For instance, Pixsy.com is a free online service for photographers that enables upload of a collection of Images from multiple sources. Pixsy then crawls the web to find matches, allows users to flag certain instances and offers legal recourse to have the images removed or file a claim.

Google Images is another common option for manually discovering copies of proprietary Images located online. Google performs a reverse-image lookup, and displays websites that are showing that image, or similar ones. While many results may include authorized uses, this is a great way to find altered versions or unfamiliar websites hosting copies of proprietary Images.

Another available method to help track unauthorized use of proprietary Images is to setup copyright information on the EXIF data of photographs or video. Most cameras can display the author or owner's name, and additional copyright information. This makes filing claims or takedown notices even easier in cases where an offender fails to remove or alter that information.

However, none of the methods available for protecting proprietary Images subject to copyright discussed above, nor any combination thereof, provides a foolproof way to prevent theft or unauthorized use of Images.

Traditional watermarks are proving ineffective in a culture of social posting where consumers are willing to take screenshots of watermarked photos posted online and then re-post them to their social network platforms, watermark and all.

The ability for an average web user to easily crop images has also made the application of effective watermarks more difficult. So, photographers face a difficult decision, either blur the photo to the point that it degrades the potential customer's ability to assess the quality or apply a watermark which fails to serve as a sufficient deterrent for those inclined to take the image without paying for it.

And further, after-the-fact methods of policing and protecting the copyright in proprietary Images, such as Pixsy, Google Images, and embedding EXIF data remain insufficient because they fail to prevent the occurrence of theft in the first instance.

Therefore, it is desirable to provide an improved system and method for providing proprietary Images to customers for evaluation while simultaneously protecting photographers' ability to commercialize those Images by preventing theft thereof.

SUMMARY OF THE INVENTION

The following is a summary of the invention in order to provide a basic understanding of some aspects of the invention. This summary is not intended to identify all key or critical elements of the invention or to delineate the entire scope of the invention. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

In addition, facial recognition software is known, and can be trained to find a particular face and to group Images by recognized faces. The essence of the present invention is the ability to show two alternate, reciprocal Images of the same scene, each Image useless on its own to any would-be thieves, to prospective customers to enable the customers to fully evaluate their potential desire to obtain a clean copy of said Image.

A preferred embodiment of the present invention comprises a computer-implemented system configured to facilitate the secure display of one or more alternate degraded Images, with reciprocal degraded and clearly visible areas, and purchase of one or more clean versions of the Images. The system components of the present invention include one or more computers and/or server machines, containing processors and non-transitory computer-readable media, which computers and/or servers may be connected to a network, the internet or an app. In one preferred embodiment, the system is self-contained and implemented on a stand-alone computer system that is not connected to the internet or other network system. In another preferred embodiment, the system is implemented across multiple server machines, which may operate as an integrated backend server system.

The system components of the present invention further include a database comprising Images, stored on the non-transitory computer-readable media, and wherein the non-transitory computer-readable media are loaded with a set of instructions that, when executed on a processor, cause the system to perform a series of steps, enabling this embodiment of the present invention.

Furthermore, the steps performed by the instructions include 1) detecting one or more faces, patterns or objects of interest in an Image, 2) creating a first alternate Image having at least one obstruction covering a face, pattern or object of interest detected the Image, 3) creating a second alternate Image having the same faces, patterns or objects of interest that were depicted as obstructed in the first alternate Image presented as clearly visible with all surroundings other than the faces, patterns or objects of interest obscured with degraded (i.e., lowered or decreased) resolution and/or blur, 4) displaying on a screen of the computer terminal, to a potential customer, either the first or second alternate Image as a default Initial State Image, 5) upon interaction with the Initial State Image by the potential customer, displaying on the screen of the computer terminal, to the potential customer, the other of the first or second alternate Image as a secondary Interaction State Image, 6) providing the potential customer with an opportunity to purchase a fully clear version of a selected Image, 7) completing a purchase transaction if the potential customer decides to purchase the selected Image, and 8) delivering one or more fully clear versions of the selected Image to the customer.

In addition, the patterns of interest may comprise without limitation faces, characters (e.g., pictographic or alphanumeric), patterns and objects, and the instructions may further cause the system to perform the step of recognizing the identity of one or more patterns of interest. In addition, the instructions may cause the system to also perform the step of selecting at least one face, alphanumeric character, pattern or object to obstruct in a first alternate Image based on size or number of pixels contained in the face, closeness of the face to another face or number of pixels between the faces, number of faces, identity of the faces or identity of the alphanumeric characters, strings and words.

These and other aspects of the present invention are realized in an improved system and method designed to facilitate evaluation and sale of digital Images as shown and described in the following FIGs and related description. Additional features and advantages of the invention will be set forth in the detailed description which follows, taken in conjunction with the accompanying drawings, which together illustrate by way of example, the features of the invention.

BRIEF DESCRIPTION OF THE FIGURES

Non-limiting and non-exhaustive features will be described with reference to the following figures, wherein like reference numerals refer to like parts throughout the various figures. The figures below were not intended to be drawn to any precise scale with respect to size, angular relationship, or relative position.

Various embodiments of the present invention are shown and described in reference to the numbered drawings wherein.

Figure 1:
FIG. 1 is an example of a watermarked photo viewable online at the website of a purveyor of sports photography, which was copied from Google images results.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single FIG, and as such, multiple FIGs are presented to separately illustrate the various details of the invention in greater clarity. Similarly, not every embodiment need accomplish all advantages of the present invention.

DETAILED DESCRIPTION

The invention and accompanying drawings will now be discussed so as to enable one skilled in the art to practice the present invention. These, and other, aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims.

Many changes and modifications may be made within the scope of the present invention without departing from the spirit thereof and the invention includes all such modifications.

Specifically, any reference to face or faces in this document shall be interpreted to also implicitly refer to patterns, objects and/or characters and references to detection or recognition of faces in this document shall be interpreted to also include and implicate detection and/or recognition of patterns, objects and characters (e.g., pictographic and/or alphanumeric characters).

In addition, patterns and/or objects of interest may comprise without limitation shapes, logos and trademarks, pictographic characters, alphanumeric characters, and strings of characters, including without limitation jersey numbers, jersey names, helmets, bib numbers, words and sentences. Further, any reference to or description of faceboxes and the construction of faceboxes in this document shall be interpreted to also refer to a box or rectangle constructed to circumscribe roughly the edges of a pattern, object or character of interest.

Further, any references to computer, terminal or computer terminal in this description shall include, without limitation, computer kiosks, tablets, desktops, laptops smart phones, smart watches, smart TVs, or any other specialized piece of hardware capable of displaying a computer interface via screen, holographic projection or any other means.

In a preferred embodiment, the invention enables potential customers to evaluate the quality of the image in totality but not in such a way that it can be screenshot, allowing a would-be thief to derive value from the Image prior to paying for it. This is achieved by showing the user mutually complementary Images, each having characteristics that make them independently unusable, but which enable the user to evaluate the Image in its entirety. The invention will allow photographers to merchandise and sell their images online with less theft thereby increasing their sales of such images.

The invention comprises an online platform for viewing, selecting and obtaining photos and video taken by corporate service providers as well as the various "mom and pop" service providers currently operating in the event photos and video market space, as well as remotely or automatically operated cameras, such as used by amusement parks and other venues. Additional events of interest may include but are not limited to school events, sporting events, concerts, festivals, parties, galas, charity events, vacation cruises, weddings, resorts, tourism sites, amusement parks, theme parks, zoos, museums, camps, or any other venue.

In summary, embodiments of the present invention that are connected to an online platform have access to Images produced by tens of thousands of companies and individual professionals that are aggregating many petabytes of content. Many of these companies and individual professionals are practicing the traditional systems and methods for capture, offer for sale, purchase and delivery of Images. The present invention enables these purveyors of copyright protected Images to safely share the fruits of their labor. Many of these professional photographers come from a background in printed photographs and Images, which were easy to control and monetize.

However, in today's digital world, these professional photographers are suffering, especially in view of our social media driven culture, where the half-life of new Images is often 48 hours or less. And given that individuals are often willing to post copyright protected Images and/or Images that have embedded watermarks or logos without proper authorization or consent, professional photographers, such as high school sports photographers, are finding it more difficult to sell content.

Figure 2:
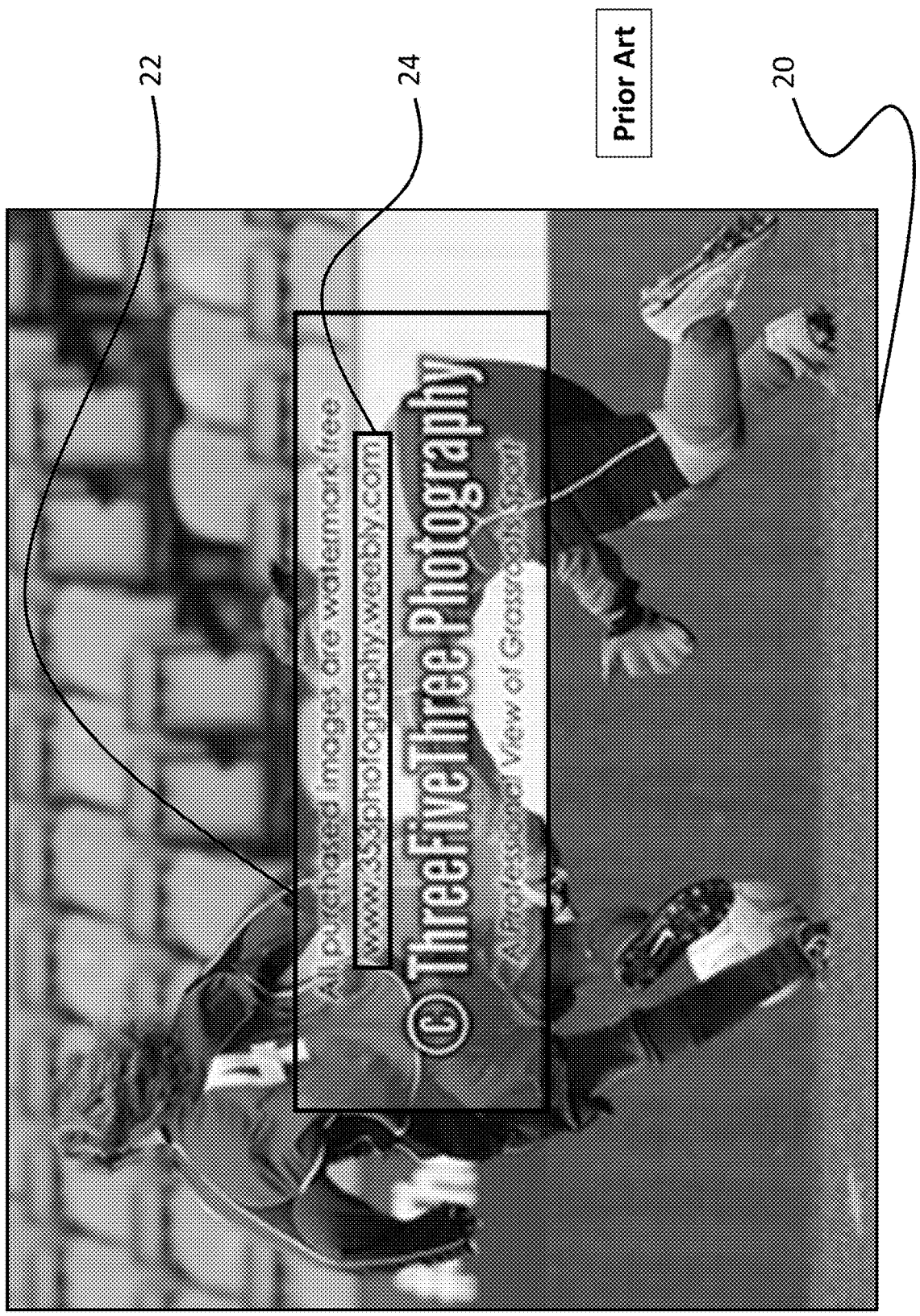
FIG. 2 is another example of a watermarked photo viewable online at the website of a purveyor of sports photography, which was copied from Google images results.
Figure 3:
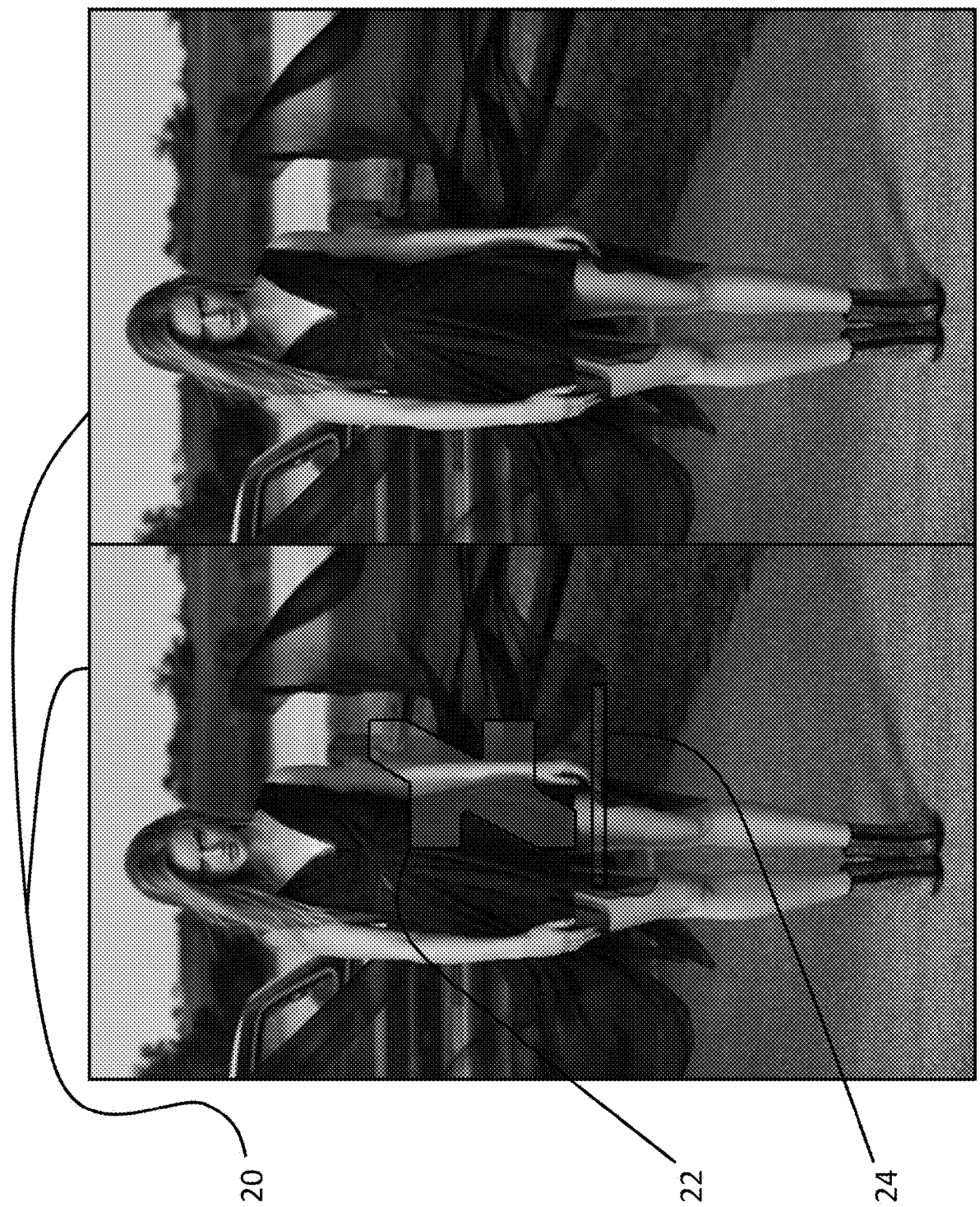
FIG. 3 is an example of a default watermark found on deviantart.com.

This is in large part due to the inadequacies of watermarks and other methods available for protecting Images, as discussed in the background section above and depicted in FIGS. 1-3. And the willingness to breach the copyright of the photographer who created the Image undermines the ability of that photographer to make a living by commercializing the content which they create.

Further, given the requirements of the Digital Millennium Copyright Act, social media platforms have no affirmative obligation to proactively prevent the posting of pirated material or content that is subject to copyright. Social media platforms, like other web hosting platforms, are only required to take down materials and content allegedly posted without appropriate authorization of the copyright holder "expeditiously", after they have received a take-down notice from the copyright holder.

Unfortunately, "expeditiously" is not well defined, and in almost all cases, the take-down notice comes after the content has been online for a significant period of time, especially considering that the half-life for social media content and Images is only about 48 hours. Consequently, for many professional photographers, it is nearly impossible to continuously monitor the internet for potentially infringing Images, posted without permission to use the underlying copyright in the Image.

Even when copyright holders are able to locate such infringing Images, it is often after the alleged infringer has extracted the desired and often subjective value (e.g., posting the Image to social media for family, friends and the public to see). And since the alleged infringers typically do not generate any revenues or make any profits from the posting of the alleged infringing content, there is little that can be expected in the way of compensation for damages—merely an injunction in the form of removal of or disabled access to the allegedly infringing content.

Consequently, the only truly viable option for professional photographers and videographers is to render the Images worthless until purchase. The present invention solves a significant problem in the industry by ensuring the ability to protect proprietary Images by rendering the Images useless for purposes such as posting on social media network platforms, while at the same time ensuring that prospective customers can view Images of sufficient quality to enable the them to adequately evaluate their desire to purchase such Images.

The present invention provides the best of both worlds, alternately obstructing or blocking elements of interest in the Image and blurring or degrading resolution for the rest of the Image with such areas of interest presented clearly. It enables Images to be covered with blockades, in the cloud (e.g., on a backend server system) on the web (e.g., on a web client via a web browser or portal) or via native apps (e.g., client side on a user's terminal or other device) or via a local computer, tablet or other kiosk, in such a way they are rendered worthless and unattractive as a screenshot to would-be thieves as the alternating states allow for clear hi-res viewing of the totality of the image but not in a single screen. The invention allows those who create and host Images that contain faces, patterns and/or objects to display such Images for sale via the web and native apps without fear that such Images will be stolen. In stand-alone computer or kiosk embodiments, the present invention prevents would-be thieves and copyright pirates from snapping a photo of an Image displayed on a screen using the same method as the embodiments with access to an online platform.

In its most basic form, the invention may use face, object and pattern recognition algorithms independently or in combination to detect the presence of faces, patterns and/or objects of interest and to apply an obstruction, such as a logo or other blockade, to cover one or more of said faces, objects, patterns, etc. found within an Image, as depicted in FIGS. 5-7, 11 & 13. As shown in FIGS. 5-7, 11 & 13, by default Images are shown in an "Initial State" with everything in the photo clearly viewable, except the patterns, objects, or faces, etc., of interest. And, as shown in FIGS. 8-10, 12 & 14, potential customers can toggle between the Initial State Image with patterns, objects, or faces, etc., blocked and a separate "interaction state" Image in which only the faces, objects, patterns, etc., of interest are clearly visible and the rest of the image is blurred.

After Images have been uploaded, in a preferred embodiment the system uses face, object and/or pattern recognition algorithms to detect and identify faces, objects and patterns, etc., of interest. The system may then obstruct or cover with a logo or other blockade the faces, objects, and/or patterns etc., of interest to the person that is using the system to view the Image, including without limitation faces of that person, their relatives, friends or other persons associated with the account profile of the person using the system to view the Image (see FIGS. 8-10, 12 & 14).

Figure 4:
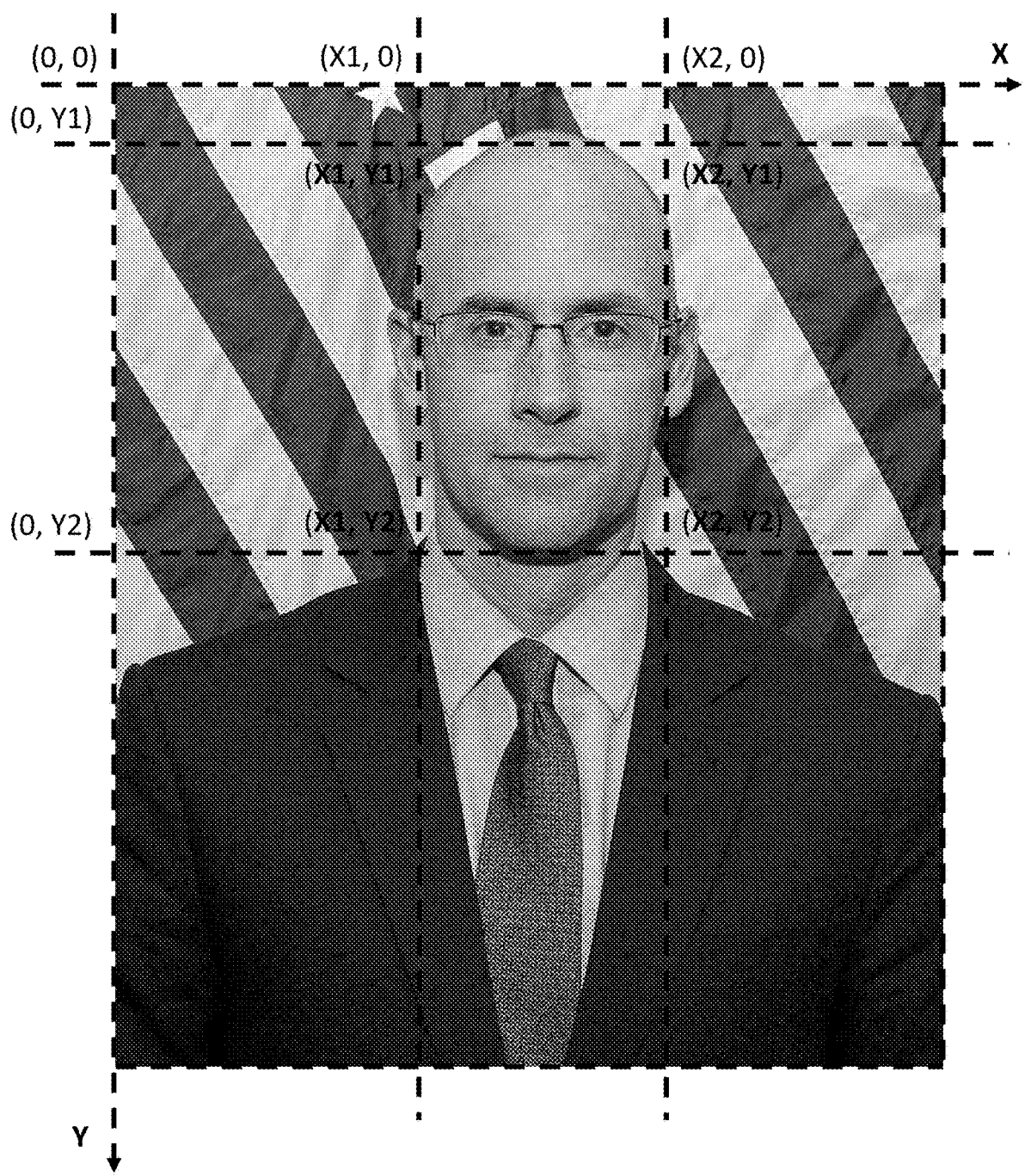
FIG. 4 depicts an example of a facebox construction with the origin (0, 0) of the Image at the top left corner.

To determine the size and placement of the logo or blockade employed to cover the faces, objects, patterns, etc., of interest, the system performs calculations to describe a "facebox"—an array of coordinates for a face, object or pattern etc., as shown in FIG. 4. These coordinates may include (x, y) coordinates for a starting point, maximum width (X2−X1), average width, maximum height (Y2−Y1), average height, and rotation (e.g., [x, y, max width, max height, rotation] or [x, y, avg. width, avg. height, rotation]).

Further, the system may determine the coordinates comprising a center-point (((X2−X1)/2+X1), ((Y2−Y1)/2+Y1)) or approximate center-point of a face, an approximate radius of a face, an approximate diameter of a face, and a perimeter or outline of a face and the width and height of a face.

In a preferred embodiment, in order to extract all of the face coordinates, the system may calculate all (x, y) coordinates of the face in question, from its starting point within an Image—at the top left (uppermost top and extreme most left) pixel of the face. All (x, y) coordinates may be calculated as ratios of the total number of pixels included in the displayed Image, and in this way the system is able to remain display-, resolution-, and zoom-agnostic.

Facebox coordinates are typically represented in an [x, y, width, height] format (face rotation or angle is an optional parameter), where (x, y) indicates the coordinates of the upper left corner of the facebox and the values are given as a fraction of total the size of the image for the respective dimension, i.e., x or y units.

By representing these coordinates as relative to the total number of pixels in either the x or the y dimensions, the faceboxes are represented in a display-, resolution- and zoom-agnostic format. That way, the display or depiction of Images can be accomplished accurately for any display screen or monitor with the coordinates being converted from relative values to actual pixels according to the current display setting (i.e., display resolution, zoom, landscape/portrait orientation, etc.).

In addition, the facebox model is adaptable to return different values (e.g., it could easily be adjusted to return x and y coordinates based on using the bottom left, top right or bottom right corner of the Image as the origin). By using the size of the "facebox" as a guiding measure, the size of a logo can be made suitable and tailored to correspond to the size of a face in the Image.

And by using the top left (X1, Y1), bottom left (X1, Y2), center point (((X2−X1)/2+X1), ((Y2−Y1)/2+Y1)), top right (X2, Y1), or bottom right (X2, Y2) of the facebox as the guidepost to locate a respective portion of the logo or other full blockade of the face can be ensured. If the watermark, logo or other blockade is not sized or positioned correctly, e.g., directly over and covering the entire face, it could result in only a partial blockade of the face of interest.

Figure 5:
FIG. 5 is an example of an initial state of a group photograph rendered unusable by obstructing the faces of persons of interest by placing logos over their faces.
Figure 8:
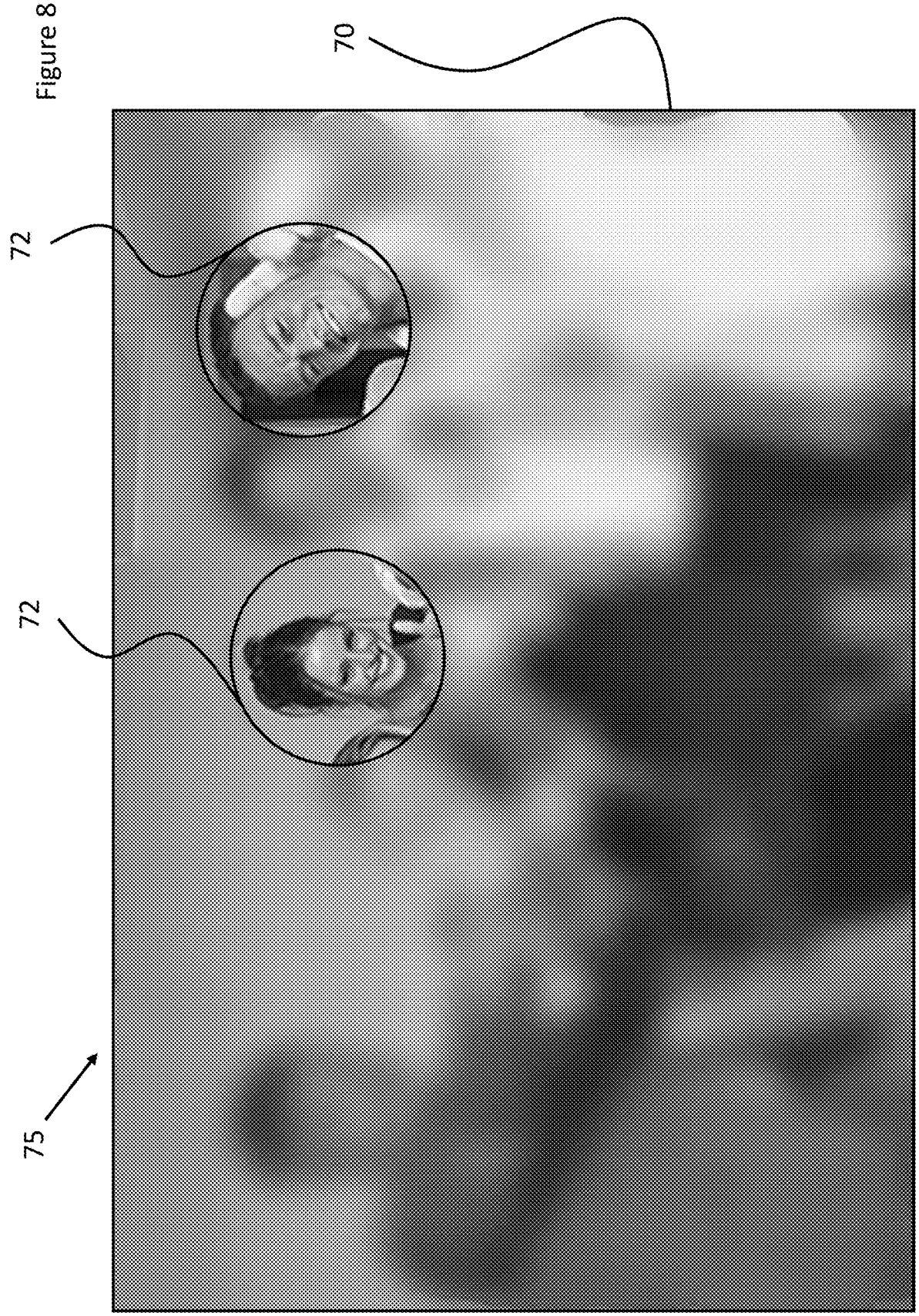
FIG. 8 is an example of an interaction state of a group photograph rendered unusable by making all areas of the photograph degraded by low resolution and out-of-focus blur, except for the faces of persons of interest.
Figure 11:
FIG. 11 is an example of an initial state of a sports photograph rendered unusable by obstructing the faces of persons of interest by placing logos over their faces.
Figure 12:
FIG. 12 is an example of an interaction state of a sports photograph rendered unusable by making all areas of the photograph degraded by low resolution and out-of-focus blur, except for the face of the person of interest.
Figure 13:
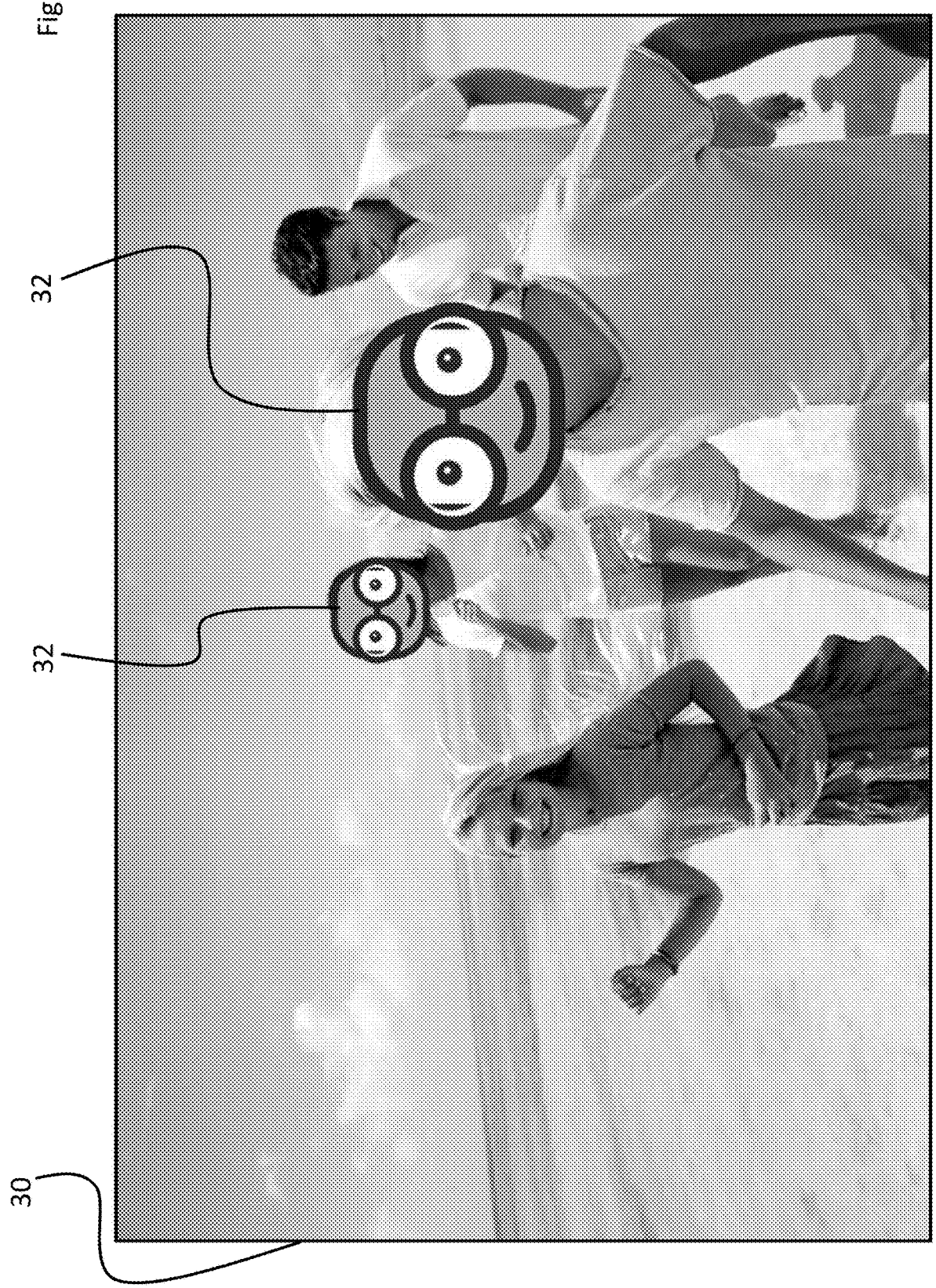
FIG. 13 is an example of an initial state of a family beach photograph rendered unusable by obstructing the faces of persons of interest by placing logos over their faces.
Figure 14:
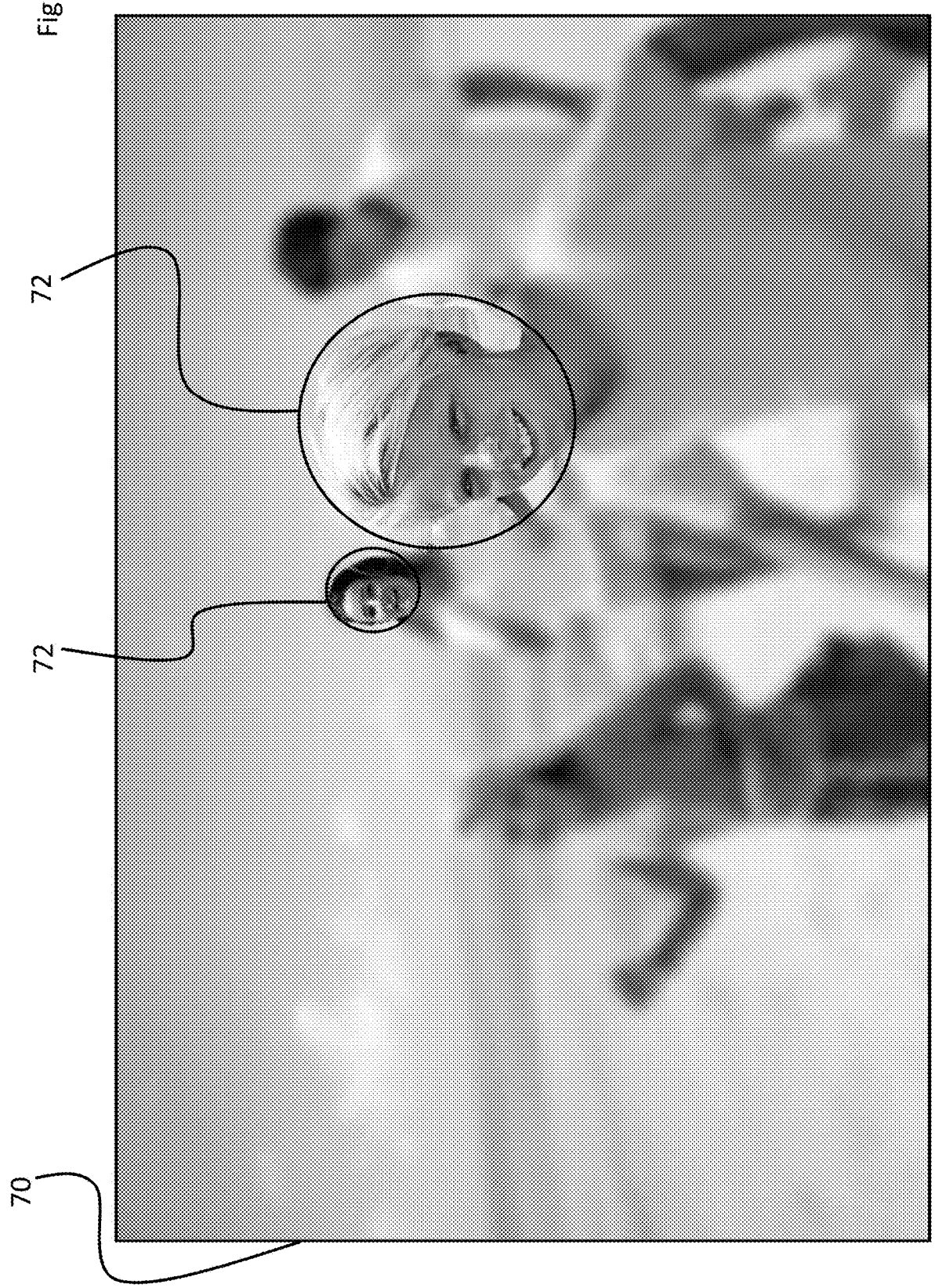
FIG. 14 is an example of an interaction state of a family beach photograph rendered unusable by making all areas of the photograph degraded by low resolution and out-of-focus blur, except for the faces of the persons of interest.

As shown in FIGS. 5, 11 & 13, covering or obstructing faces, patterns and/or objects that are of interest to the intended purchaser with a logo or other blockade 32 enables the vendor of the Images to ensure that the prospective purchaser is not tempted or enticed to attempt to abscond with a mere screen shot of the Image 30 in question. However, the intended purchaser still needs some way to be able to evaluate the quality of the Image with respect to the faces, patterns and/or objects that are blocked. And so, as depicted in FIGS. 8, 12 & 14, providing a second view of the Image wherein the faces, patterns and/or objects that are blocked in the first view of the Image are shown clearly in the second view of the Image (i.e., as clear faces 72, or patterns, objects, etc.) while the rest of the Image 70 is blurred enables the potential purchaser to make an appropriately informed decision regarding whether they in fact want to purchase the Image.

The system may achieve this objective using one of three scenarios, which all obtain the same result—enabling the user or prospective purchaser to view alternating versions of the Image, an Initial State Image 35 (FIG. 5) with faces, patterns and/or objects of interest blocked and an Interaction State Image 75 (FIG. 8) with faces, patterns and/or objects of interest shown clearly and all surroundings blurred. This can be achieved 1) across the server and client sides of the system, using the server(s) to perform one or more of detection and recognition of faces, patterns and objects and one or more of a web browser, local operating system or native software application residing on a computer terminal to create the alternate Images, 2) on the back end server side of the system, using the server(s) to perform one or more of detection and recognition of faces, patterns and objects and to create the alternate Images, or 3) on the client side of the system, using one or more of a web browser, local operating system and native software application to perform one or more of detection and recognition of faces, patterns and objects and to create the alternate Images.

Client side versions implemented entirely within local operating system, entirely within a native software application, or across a local operating system (OS) and a native software application, may be implemented on a stand-alone computer terminal, independent of any network connection. Computer terminals implementing such OS and native app versions may or may not have a connection to a network, such as the Internet, but for these implementations such network connections are not utilized and are of no consequence.

The foregoing described scenarios are exemplary only and should not be construed to limit the way in which the creation and display of the alternate Images is accomplished. For instance, it might be desirable to split detection and recognition of faces, objects and/or patterns between the server side and client side of the system. Likewise, it might be desirable to split creation of the alternate Images between the server side and client sides of the system.

In the cross server-client embodiment of the first scenario, the client side computer terminal retrieves or receives any Images of interest (e.g., via a web browser or native application). For web browser implemented embodiments, the web client then creates or receives a URL where the Image(s) of interest is/are located (i.e., stored and saved). For native application and local operating system implemented embodiments, the client may store the Images of interest on local non-transitory computer readable media (e.g., without limitation flash memory, solid state hard drive, etc.). Image metadata (e.g., EXIF) provides information about any faces, patterns and/or objects detected or recognized within the Image(s) of interest. The client then creates two (2) copies of each Image, two layers of same photo—a first copy of the Image 50 superimposed on top of a second copy of the Image 60 (see FIG. 6). In these embodiments, the "logic" (i.e., without limitation detection and/or recognition of faces, patterns and/or objects) is performed on the server side and the alternate blockaded and blurred/degraded-resolution Images shown to the user are created and stored on the client side.

Figure 6:
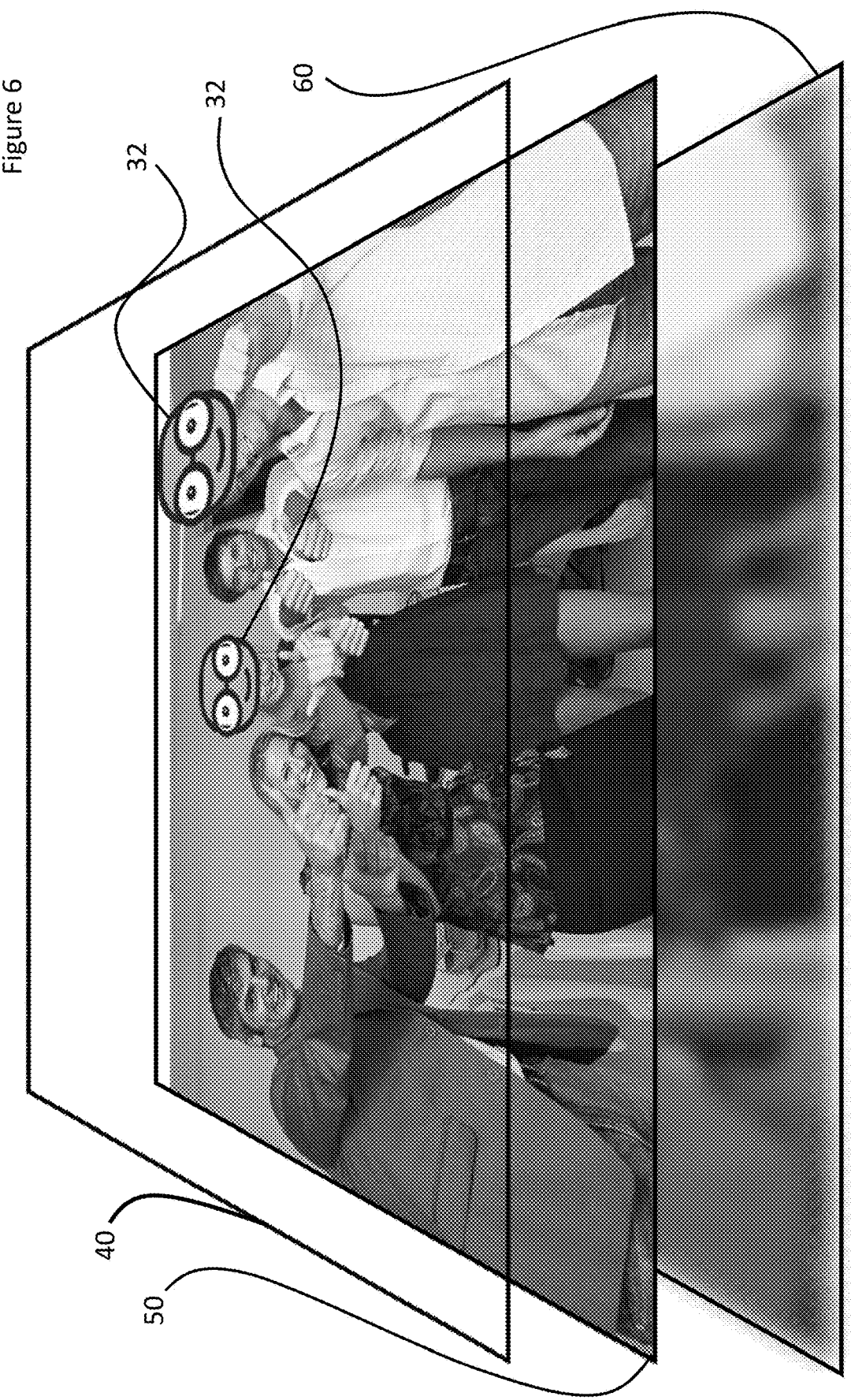
FIG. 6 is an illustration of the layers of images, with a single layer of face blockades, employed to achieve the result of the group photograph with blocked faces shown in FIG. 5.

For cross server-client embodiments, the server returns an Image URL and Image facebox coordinates (e.g., without limitation, in JSON format). The client then takes that data and creates the obfuscated image construct. As shown in FIG. 6, in the client side implementations (i.e., first and third scenarios, respectively cross server-client and stand-alone client embodiments), the Initial State Image 35 may include three layers—the bottom layer Image 60, which is entirely and always blurred, the top layer Image 50, which is entirely and always clear, and a blockade layer 40, including a logo or other blockade 32 placed over the coordinates of the facebox for each face, pattern and/or object of interest.

Figure 7:
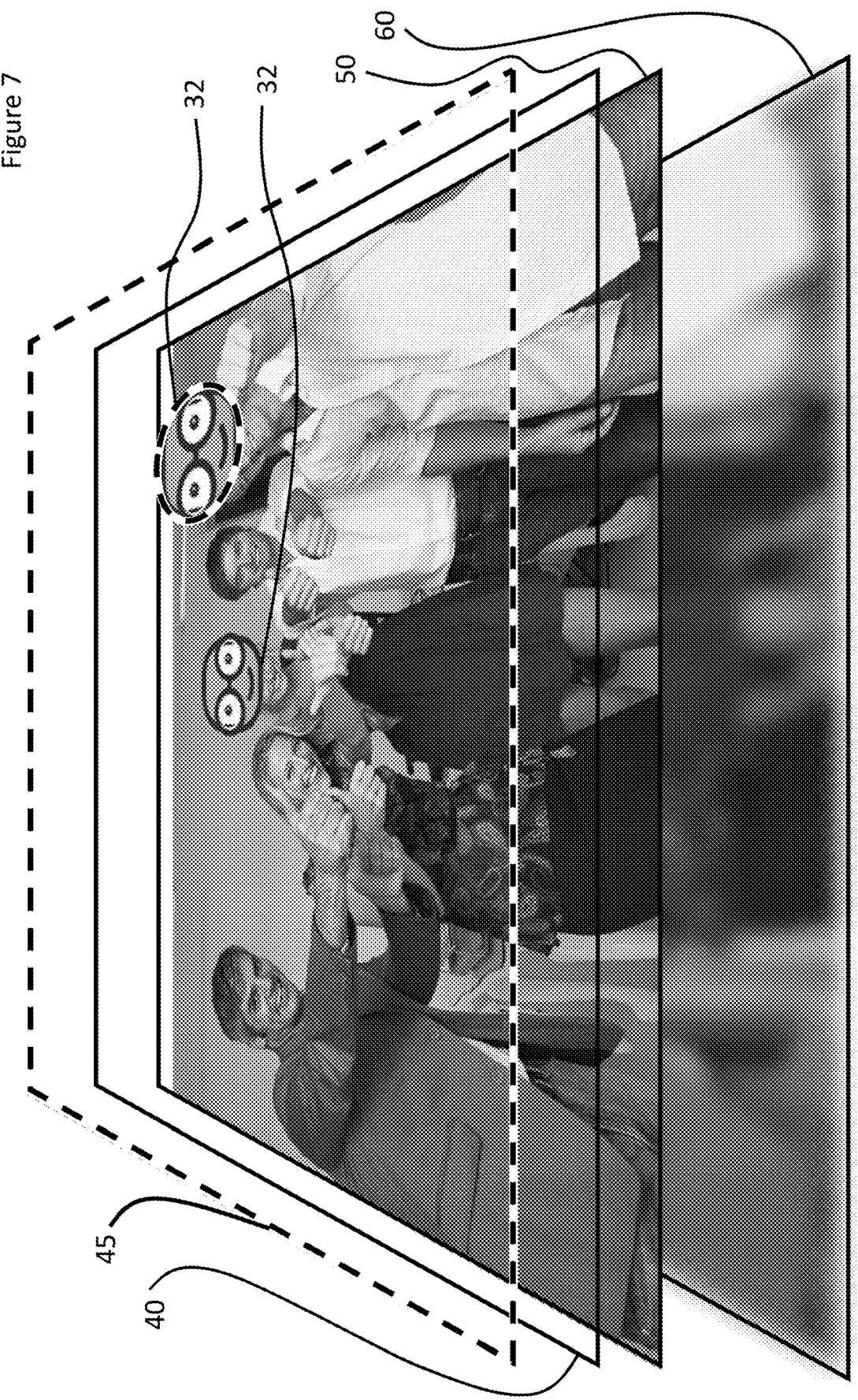
FIG. 7 is an illustration of the layers of images, with a layer for each face blockade, employed to achieve the result of the group photograph with blocked faces shown in FIG. 5.

And as shown in FIG. 7, the Initial State Image 35 may include multiple layers—the bottom layer Image 60, which is entirely and always blurred, the top layer Image 50, which is entirely and always clear, a first blockade layer 40 including a logo or other blockade 32 placed over the coordinates of the facebox for the first face, pattern and/or object of interest, and an additional blockade layer 45 for each additional face, pattern and/or object of interest and corresponding logo or other blockade 32.

In the client side implementations, the top layer Image 50 it is a clear version of the Image that may be overlaid by N blockade layers 40, each containing a blockade 32 (i.e., logo or other obstruction) covering or obstructing a face, pattern and/or object of interest. Each blockade, i.e. logo or other blockade 32, is a separate entity that resides or "floats" above the top layer when a user is not interacting with the Image. Alternatively, the clear top layer Image 50 may be overlaid by a single layer containing N blockades 32 covering N faces, patterns and/or objects of interest.

Figure 9:
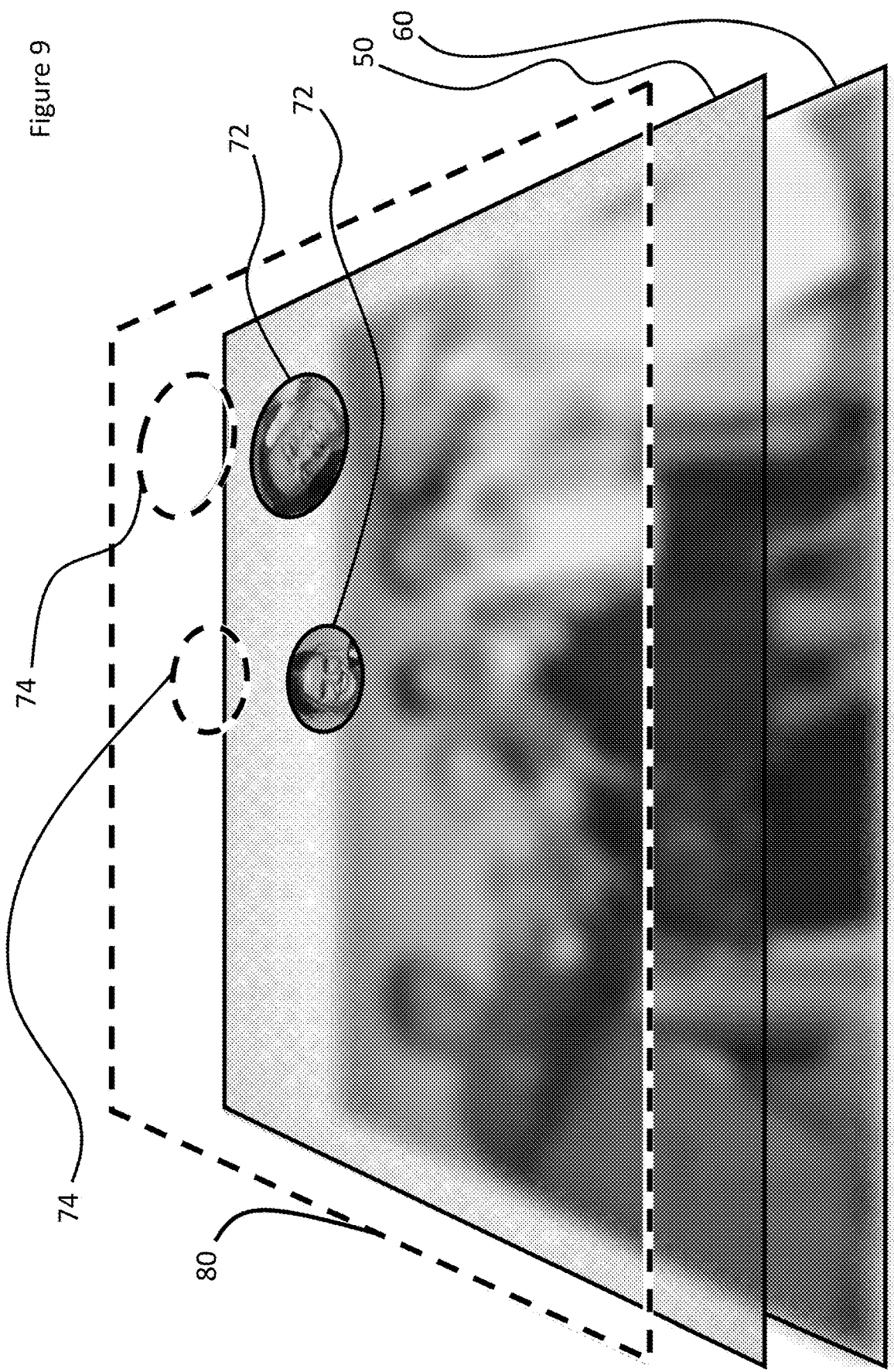
FIG. 9 is an illustration of the layers of images, with a single layer of SVG clip path face-cutouts, employed to achieve the result of the group photograph with clear faces and blurred surroundings shown in FIG. 8.
Figure 10:
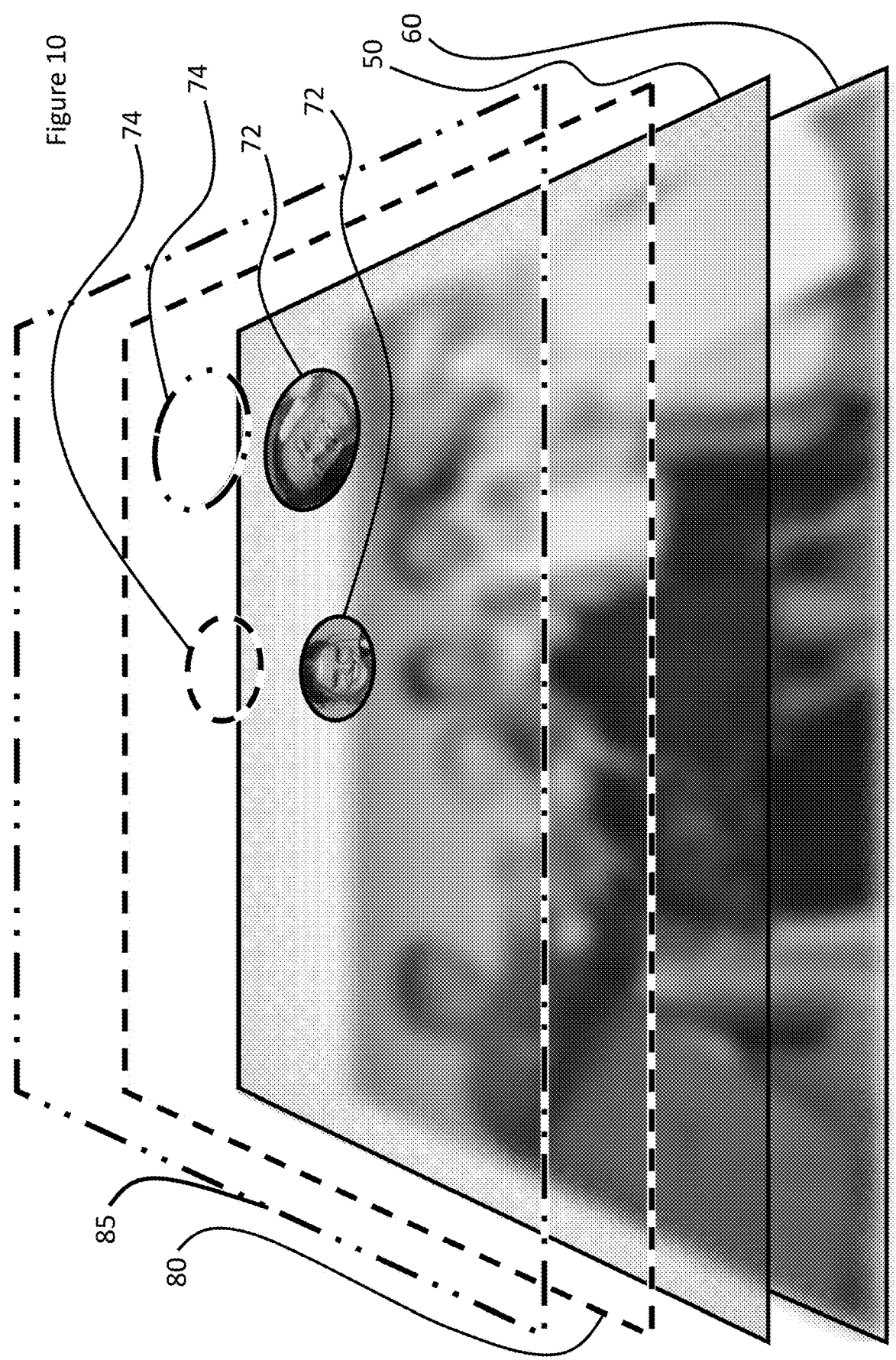
FIG. 10 is an illustration of the layers of images, with a layer for each SVG clip path face-cutout, employed to achieve the result of the group photograph with clear faces and blurred surroundings shown in FIG. 8.

As shown in FIG. 9, the Interaction State Image 75 may include three layers—the bottom layer Image 60, which is entirely and always blurred, the top layer Image 50, which is entirely and always clear, and an invisible layer 80, including clip path shapes 74 (e.g., circles) placed over the coordinates of the facebox for each face, pattern and/or object of interest. And as shown in FIG. 10, the Interaction State Image 75 may include multiple layers—the bottom layer Image 60, which is entirely and always blurred, the top layer Image 50, which is entirely and always clear, and a first invisible layer 80, including a clip path shape 74 (e.g., circle) placed over the coordinates of the facebox for the first face, pattern and/or object of interest, and an additional invisible layer 85 for each additional face, pattern and/or object of interest and corresponding clip path shapes 74 (e.g., circles).

The clip path shapes 74 defined in the invisible layer(s) determine portions of the top layer Image 50, e.g., faces, patterns and/or objects of interest, that remain unhidden and are overlaid on top of the bottom layer Image 60 in the interaction state Image 75.

The bottom layer Image 60 is blurred (obfuscated) in its entirety and is presented as a whole except for an overlay of clear faces, patterns, and/or objects defined by the clip path shapes 74, for the same faces, patterns and/or objects that are blocked in the top layer Image 50, superimposed over the blurred faces, patterns and/or objects. At first, the bottom layer Image 60 remains out of view because it is located underneath, or below the top Image 50 that covers it (FIGS. 6 & 7). But then, when a user interacts with the element containing the two Images, the top layer Image is hidden except for the clear faces, patterns and/or objects (FIGS. 9 & 10).

This is achieved by overlaying an invisible layer circumscribing the faces, patterns and/or objects of interest in the top clear Image with clip paths, using the same or a similar perimeter as that determined for the logo or blockade, which cuts out the clear faces, patterns and/or objects of interest from the top layer image while hiding the logo or blockades and the rest of the top layer image (see FIG. 7).

In the web version the blockade layers 40, 45 and the invisible clip path layers 80, 85 are implemented via scalable vector graphics (SVG). Within the SVG, a defined clip path shape (e.g., circle) is drawn, one for each facebox existing on the image. To define a clip path circle, a software function calculates the maximum edge length dimension of the facebox and returns it as a ratio or percentage of that dimension (X or Y) within the Image, and then a circle is drawn inside the SVG using: https://developer.mozilla.org/en-US/docs/Web/SVG/Element/circle, where <circle> is defined using just three (3) parameters: cx, cy, r.

cx: the center of the drawn circle on the horizontal axis (calculated as centerX)

cy: the center of the drawn circle on the vertical axis (calculated as centerY)

r: the Radius of the circle (calculated as facebox max edge length/2)

This circle description is implemented as a clip path within the SVG, once for each face, pattern, and/or object of interest in the Image.

For any given Interaction State Image 75, there may be N "floating" clear faces, patterns, and/or objects 72, etc., displayed over the completely blurred bottom layer Image 60. But, as the images are identical it creates the illusion that the Interaction State Image is displayed is a single image.

In this way, the image that the user sees includes the unobstructed clear faces, patterns and/or objects 72, etc., from the top layer Image 50 that is superimposed over the blurred bottom layer Image 60, resulting in clear faces, patterns and/or objects of interest while the rest of the Image is blurred out. When user interacts with the image, e.g., mouse click or hover, etc., the system employs the invisible layer(s) 80, 85 superimposed above the top layer image 50 to clip the faces, patterns and/or objects of interest and show them clearly over the bottom blurred photo.

In most cases, for face detection or face recognition, the clip path shapes 74 employed are based on the same rectangle as described by the facebox, just with fully rounded corners and increased slightly in size by applying some degree of scale or a multiplication factor in order to fit over natural features associated with the faces, such as hair and ears, etc., on account of the fact that the faceboxes typically circumscribe the faces of interest very tightly. The scale or multiplication factor may be a fixed value (e.g., a ratio or proportion of the total size, such as 1.01 to 1.25) or it may be dynamically determined based on face shape, angle, etc.

Essentially, the rounded corners of the scaled facebox are described by a radius R of some numerical value. If R=0, the corner is a full 90-degree right angle. If the rectangle is a square of 10×10, then a corner with radius R=5 would turn create a circle with a diameter of D=10.

But, since faceboxes are not usually perfect squares, the length (L) of the longest edge of the facebox rectangle is used to determine the corner radius for the clip paths 74 by dividing the longest edge of the facebox by 2 and using half of the length of the longest edge as the corner radius, L/2=R.

Faces may be selected by the system for obstruction or blockade in a first alternate Image based on one or more of absolute size of a face, size of a face relative to the size of other faces in the Image, number of pixels contained in a face, blocking some arbitrary number of largest faces closeness of a face to another face or number of pixels between two faces, number of faces and identity of the faces, recognition of a face matching a user's faces or a face associated with or found in the user's account profile, including without limitation one or more of faces of relatives, friends, and social media connections.

In addition, web browsers and computer operating systems have become capable of exposing native face, pattern and/or object recognition APIs and include the ability to perform face, pattern or object recognition directly within web clients. local OS and/or native apps, independent of server side assistance.

Similarly, web clients and native apps may be configured to leverage native face, pattern or object recognition APIs that become available within a computer operating system environment (e.g., including without limitation, iOS, Android, Microsoft Windows or Linux).

In the second scenario, as opposed to the client side implementations (i.e., first and third scenarios, respectively cross server-client and stand-alone client embodiments) where three or more layers per alternate Image are required to achieve the desired result, the server system makes and saves two single-layer alternate Images for each Image of interest in addition to an original clear copy of the Image. Images of interest may be dynamically selected based on the identity of a user using the system.

In these server-implemented embodiments, the face, pattern, and/or object recognition algorithms reside and are implemented on the server side, and these algorithms process, locate, and match the faces, patterns and/or objects on every image before the client retrieves them (even in obfuscated form). In these embodiments, the only function performed by the client side computer terminal is to display the alternate Images to a prospective customer and provide the opportunity to purchase the Image.

For the server side implementation the Initial State Image comprises a single top layer Image 50 containing a clear copy of the Image with integrated logos or other blockades obstructing faces, patterns and/or objects of interest, wherein the logos or blockades are not separable from the top layer Image 50, and the Interaction State Image comprises a single bottom layer Image 60 containing a blurred copy with clear faces, patterns and/or objects integrated within the Image in place of the blurred faces, patterns and/or objects of interest, wherein the clear and blurred or degraded portions of the bottom layer Image 60 are not separable.

With the server side implementation, only these two layers are required, as opposed to the client side implementations (e.g., without limitation, within a web browser, local OS or native application) where achieving the objective requires three or more layers per alternate Image to achieve the desired result.

In the server side implementation, the same calculations are performed for the facebox, perimeter, width, height and center point of the faces, patterns and/or objects enabling accurate placement and sizing of the logos or other blockades 32 as well as the placement of the clear faces, patterns and/or objects 72, etc., on top of the blurred bottom layer Image 60.

The server side implementation can accurately display the alternating Initial State and Interaction State Images in any client device, sending the two images that have been created on the server side to the client. All that needs to happen to obtain the desired result is to hide the top layer image with the logos or other blockades. Further, for the server side implementation, the determination of which faces, patterns and/or objects to block may be made on the identity associated with a request made to the backend database, meaning that any face, pattern and/or object recognition algorithms will also need to be implemented on the server side. Everything happens server side and the two alternate states of the Image are dynamic sent to the client and displayed to the user based on retrieving the correct versions of the Image from the server side database.

In such server side implemented embodiments, multiple copies of each Image may be stored in the server side database. Typically, these versions of the Images include an obstructed copy of the Images with relevant obstructions covering the features of interest, a blurred or degraded copy of the Image showing clearly the features obstructed in the obstructed copy, but with all surrounding features blurred or degraded with low resolution, and a third fully clear copy of the Image.

For the alternate blockaded and blurred/resolution-degraded copies of the Image(s) the blockades and blurring/degraded-resolution are integrated within and not separable from the respective alternate Image. A potential customer is permitted to alternately view the obstructed and blurred/degraded-resolution copies of the Image through their terminal, i.e., whether a web client or a native app client, respectively as either an Initial State Image or an Interaction State Image. Once a purchase transaction is completed, the fully clear copy of the Image is delivered to the customer. Delivering one or more copies of the fully clear version of the selected Image to the customer may be accomplished through one or more methods including, email, text, delivery to a user account via one or more of an online web platform and a native application, and providing access to a shared electronic folder.

In the server side implementation, the computer terminal is further connected to one or more server machines, having a data connection to a communications network. One or more of the server machines are in data communication over the communications network with one or more of other server machines, a web client, local OS and a native application. Further, one or more server machines may operate as an integrated backend server system and are connected to, without limitation, one or more processors and one or more non-transitory computer-readable media. The database of captured Images is stored in one or more non-transitory computer-readable media accessible by one or more of the server machines, and computer readable instructions are loaded on one or more of the non-transitory computer-readable media accessible by the one or more server machines.

In the third scenario, web browsers, native apps or other platforms that natively support face, pattern and/or object recognition (e.g., including without limitation, iOS, Android, Microsoft Windows or Linux) the client may be configured to perform detection, recognition and/or obstruction of faces, patterns and/or objects without the need for external server assistance. Such native support of detection and recognition of faces, patterns and/or objects may be integrated on a stand-alone client terminal, such as a computer kiosk, tablet, desktop, laptop or other specialized piece(s) of hardware (e.g., located at a monument, amusement park, arena, stadium or other convenient or appropriate location), or even on the user's own computer terminal device (e.g., smart phone, smart watch, smart TV, tablet, laptop, desktop, etc.). In such implementations, the client may perform all of the "logic" (i.e., detection, recognition, obstruction, display of alternate Images) and the server side of the system may be involved simply to provide Images or a set of Images or it may not be involved at all.

Native application and computer operating system (e.g., including without limitation iOS, Android, Microsoft Windows and Linux) stand-alone implementations do not differ much from the web client side implementations. These embodiments typically include the following features: 1) retrieving Images from one or more of a non-transitory computer readable medium, an integrated camera and a camera connected via wire or wireless means such as, for example and without limitation, including Bluetooth, Wi-Fi, NFC or Direct LTE, 2) employing pattern, object, and/or face detection to determine where to overlay the logo or other blockade 32, 3) creating alternate degraded/obscured Images, each of the alternate Images having complementary or reciprocal degraded and clearly visible areas, e.g., by overlaying the logo or any other blockade 32 on top of one or more selected patterns, objects, or faces of interest and blurring degrading the resolution of all areas surrounding the selected face, patterns and/or objects of interest in a second alternate Image, and 4) Setting one of the first and second alternate Images as a default Initial State Image that is shown to a user and when the user interacts with a displayed Initial State Image, displaying the other of the first and second Image as an Interaction State Image.

Either of the Initial State Image and Interaction State Image may include the blockades 32. The other of the respective Initial State Image or Interaction State Image that does not include the blockades will display a version of the Image that clearly depicts the objects, faces and/or patterns of interest with the rest of the image blurred and/or depicted with degraded resolution.

In addition, these native app or local OS embodiments may further include one or more of the following features: 1) retrieving Images from a backend server platform, 2) use facebox metadata and/or recognition of faces associated with the user's account profile to determine which faceboxes need obfuscation, 3) overlay the logo or any other blockade 32 on top of the selected faceboxes by taking into consideration the size and rotation of the faceboxes' metadata as they are calculated on our platform, 4) when the user taps & holds on a photo, the Image is blurred during the runtime using native OS frameworks leaving an un-blurred cut-out rect (e.g., clip path shape) over the facebox, where the logo or other blockade 32 was located, effectively allowing the user to see the faces, objects, and/or patterns in high-res but leaving the rest of the picture in blurred/low-res status.

In an alternative embodiment, rather than calculating the facebox dimensions, location and other metadata on the server, faceboxes may be determined using native OS frameworks. In addition, some Images may be pre-blurred in the background for performance reasons or to be more readily available. When the user releases the tap on the photo, the photo goes back into obstructed or blocked state.

In additional alternative embodiments, obfuscation contexts may be embedded into the Image (e.g., JPEG) metadata (e.g., EXIF) in a custom proprietary format so that these Images can be carried along to other clients/platforms external to a vendor's specific ecosystem. So, if an external vendor needs to display obfuscated Images, they can utilize the EXIF to determine where to place the blockade 32 without requiring direct communication with a central server platform to obtain the facebox metadata.

EXIFv2 supports two special tags that allow for custom metadata to be associated with the image. These are MakerNote and UserComment and can be exploited by us to store obfuscation information in the form of a comma separated list of values that describe each facebox where obfuscation is required.

Usually faceboxes are used in [x, y, width, height] format (face rotation or angle is an optional parameter) and the values are relative to the size of the image. So, a sequence of 0.5, 0.4, 0.1, 0.2, 0.4, 0.3, 0.1, 0.1 in the MakerNote field would indicate that this photo needs two facebox obstructions at [0.5, 0.4, 0.1, 0.2] and [0.4, 0.3, 0.1, 0.1].

A single command, including but not limited to a keystroke, tap, mouse click or voice command may be used to toggle between the alternate Images, and in doing so view the faces clearly, alternately with clear bodies and surroundings. In this way, each individual Image is aesthetically useless as a screenshot while allowing the prospective customer to fully evaluate the Image. Only upon purchase, will the customer receive a single, fully-integrated, clean version of the Image.

The invention may also target a set number of faces, faces of a certain size, width or height, faces including a certain number of pixels, or faces within a certain proximity or number of pixels of each other for obstruction within an Image. For instance, the three largest faces may be obstructed in the embodiment where only face detection is employed and the identities of the subjects of the Image are not known. As seen in the example depicted in FIGS. 5-7, 11 & 13, the system may be configured to only cover, block or obstruct a single face, but the system may also be configured to cover all faces or only some faces or faces belonging to specific identities or persons present within the Image.

Alternatively, where identities of subjects in an Image are known, various algorithms may be used to determine which faces should be obstructed within an Image, based on the identity of the prospective customer and/or the identity of one or more persons of interest in the Image. For example, if accessed through an online or app user-profile based social network or platform, faces of persons known to the user or faces of persons belonging to the same group, club or other organization to which the user belongs may be dynamically blocked depending on the identity of the viewer.

Further, for sports or other activities where player's faces are obstructed by helmets or face masks, but wherein the players also wear jerseys or bibs with numbers and/or names included on the jerseys or bibs, the system may be configured to recognize pictographic or alphanumeric patterns and to block out patterns, numbers or names included on the jerseys or bibs rather than faces.

The present invention utilizes these methods of face, pattern and/or object recognition to achieve the targeted and complete obstruction of the most valuable elements of the Image. Because the obstruction obtained by the present invention is dynamic, based on patterns and features present within the Image, would-be thieves have no ability to crop or otherwise obtain or use the Image without the authorization and consent acquired through purchase of the Image. Further, prospective customers are easily able to evaluate the quality of the Images they would receive through such purchase.

Figure 15:
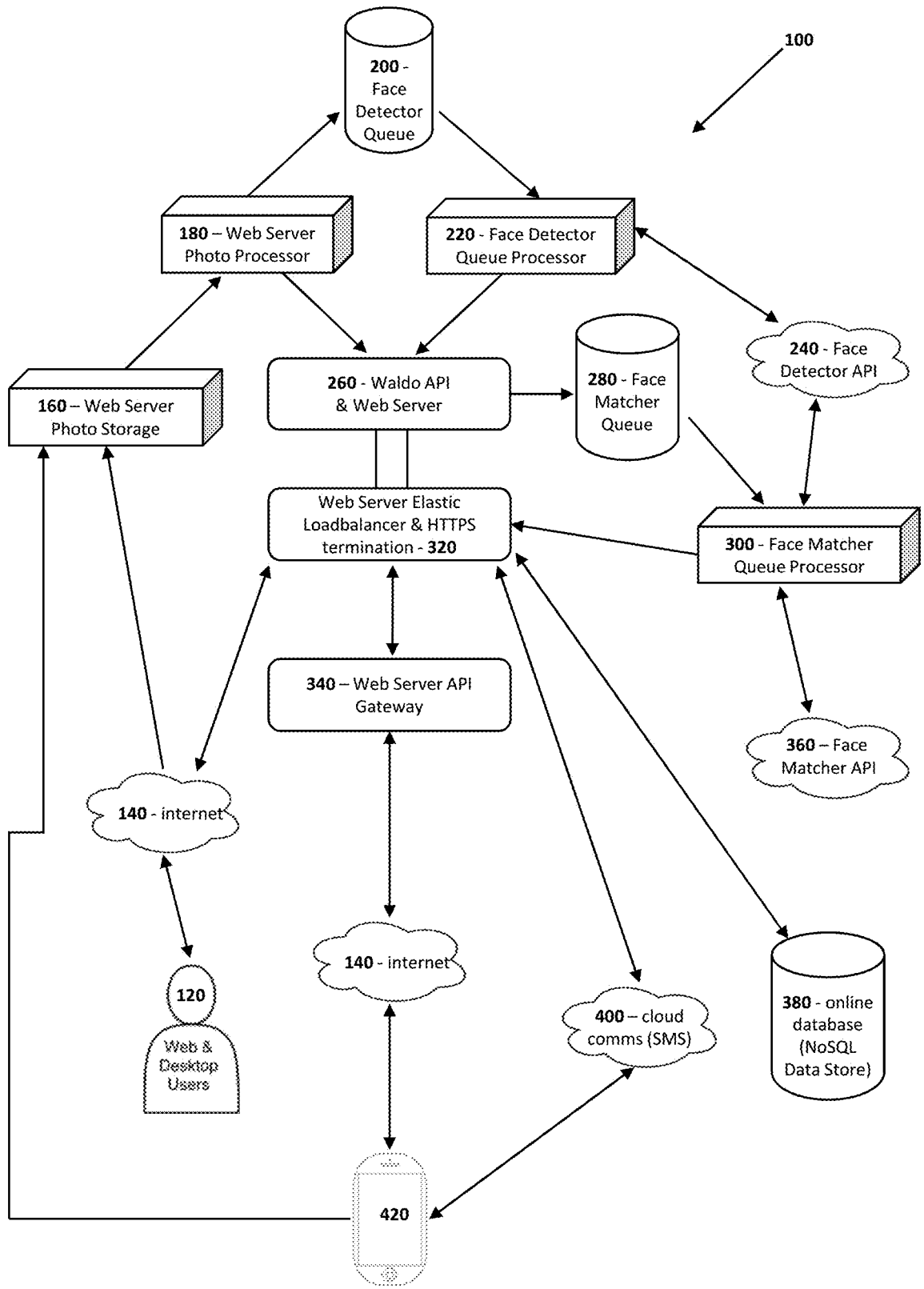
FIG. 15 is a system diagram depicting the various components of the system.

As depicted in FIG. 15, a preferred embodiment of the system 100 of the present invention may comprises a system directed to delivery of proof Images enabling a potential customer to make a decision of whether to purchase a clean version of the Image and embodies a core set of mechanisms and functionalities. These mechanisms and functionalities may include a communication network, such as the internet 140 or cloud based communications services 400 operated by and/or interfacing with a backend server system 260; display devices 420 configured to connect to the communication network, to receive Images through the communications network and to display the received Images to a User via an application for mobile device 420 or web or desktop application 120. In other preferred embodiments of the present invention, the computer and display mechanism may be stand-alone and disconnected from the internet or other network systems.

The server machines and backend server system of the present invention may comprise one or more of rackmount servers, desktop computer platforms, laptop computers, tablets, and smart phones. These computational devices may be operated as one or more standalone servers and/or an integrated backend distributed server system 260, for instance managed by a dynamic, elastic load balancer 320 and gateway application program interface 340, such as the AWS API gateway, as shown in FIG. 15. Further, Direct LTE provides the capacity for smartphones to operate as an integrated, distributed backend server system.

Once Users have registered for an online account (e.g., via a textbot service or a native app) or downloaded a system application giving them access to the system backend, they can upload and share content, including information and Images, via the cloud and may be prompted to do so. Images and content may be uploaded directly to a database located on backend cloud servers, for instance an online database 380, such as an online NoSQL data store, and/or online photo store 160, such as the Amazon Web Simple Storage Service (S3) Photo Storage. Following upload of content, the stand-alone computer or backend server system may perform detection and/or recognition of faces, patterns and/or objects in captured Images.

FIG. 15 also shows that face, pattern and/or object detection may employ one or more of a pattern, object or face and detector queue 200, a face, pattern and/or object detector queue processor 220 and the face, pattern and/or object detector API 240. Face recognition may employ one or more of a face, pattern and/or object matcher queue 280, a face, pattern and/or object matcher queue processor 300, a face, pattern and/or object detector API 240 and a face, pattern, and/or object matcher API 360. Upon receiving a positive match in response to the recognition search of Images in which the User, persons, faces, patterns and/or objects known to the User or persons, faces, patterns and/or objects indicated as of interest to the User are recognized, the system will cover the faces, patterns and/or objects recognized with an obstruction, such as a logo or other blockade 32. Further, faces, pattern and/or object recognition and detection algorithms may be implemented as part of the integrated backed server system or web browser, or as part of a native app or other platform (e.g., local OS) on a stand-alone device, e.g., kiosk, smart phone, smart watch, smart TV, tablet, laptop or desktop, etc.

Within the contexts of the system and method of the present invention, a User may complete a registration for a User account, such as an online web account or a desktop application account, configured to implement the system, integrating one or more User devices (120 and 420) with the backend server system 260. The User may be prompted to register for the User account using any of the many various social networking platforms, or the User may provide registration details directly to the system—including at least cell number and a profile photo, e.g., a "selfie" or other "test" Image, with the Users' profile photos provide test Images for running pattern, object and face recognition searches.

When a person desires to register for a particular album of Images for a particular event or for a specific set of location and time criteria, the system may prompt the user to provide a selfie and ask user to join an album, deliver all of the images with their face—or faces that are associated with their account.

In one embodiment, the system is configured to acquire, store, search and select captured Images, and to deliver selected Images to system Users. The system of this embodiment comprises several elements including but not limited to server machines 260, including at least processors and on-board non-transitory computer-readable media among many other components, wherein these server machines are connected to a communications network and may operate as an integrated backend server system 320 and 340.

The system of this embodiment may additionally include databases of captured Images 160 or 380 stored by the server machines in non-transitory computer-readable media and User digital profiles containing User photographs. Further, computer readable instructions stored in the non-transitory computer-readable media contained on or otherwise accessible by the server machines 260, when executed on a processor, may perform one or more steps in sequence, in parallel or out of sequence.

The steps performed by the instructions loaded on the non-transitory computer readable media, when executed on a processor, may additionally include: restriction of the database of captured Images based on face, pattern and/or object detection, i.e., detecting the mere presence of a face, the size of a detected face, a number of pixels contained in a detected face, the number of pixels between detected faces, a percentage of total pixels contained within a detected face, a distance of a detected face to the imaging device and an orientation of a detected face relative to the imaging device.

When Users or other persons of interest are indicated as present at a particular event or place and time, the system is configured to automatically run face, pattern and/or object recognition comparisons on Images indicated as captured within a selected radius of the location and time window of the event. To perform face, pattern and/or object recognition, the system software employs profile photos ("test Images") uploaded to a User account via the website, app or text, to search a database of Images, collected at a specific venue, event, location or time, for positive matches against the test image or a set of test Images.

When there is a match, the User is alerted via the app, website or text message and enabled to procure such image. The software of the system can mine Images on social media and send an alert to a User to notify them and provide an offer to deliver of selected Images.

The backend server system may further be configured to obtain test Images of persons' faces and to perform face recognition on the captured Images using the test Images and to deliver, via the display devices, Images captured including persons recognized and an alert notification regarding the presence of persons identified as of interest by a User.

The steps performed by the instructions loaded on the non-transitory computer readable media, when executed on a processor, may alternatively include: input to a digital profile of test Images for a person of interest by scraping the test Image from an online website or receipt of a test Image from a User via a User account, text account, web, mobile and personal computer application accounts, and email, social network and social media account. The test image may preferably be captured by an imaging device, such as a smart phone, associated with a User account.

The utility and efficiency of systems like the current invention can be greatly enhanced by the ability to use geolocation and geofencing to narrow the set of Images included in the database searched for face recognition matching and identification of subjects. The system may utilize User smart devices, and the clock and locations services embedded within such smart devices, to log locations and respective time records for Users.

In selecting content and sets of Images to include in a database of captured Images to be searched for facial recognition positive matches, the system software compares User time and location records to the time and location of the content submitted by Photogs, e.g. as included in the EXIF data. The backend server in this embodiment may further be configured to recognize persons based on factors including face recognition, identification of User devices, numbers on sports equipment, and bib numbers or jersey numbers, jersey names to deliver Images of recognized persons to Users.

The steps performed by the instructions loaded on the non-transitory computer readable media, when executed on a processor, may further include: recognition of persons of interest in captured Images based on subject face recognition, a unique identifier of a User device, a number on sports equipment, and/or a bib number or a jersey number or jersey name, and determination of a captured Image to be an Image of interest based on recognition of a person of interest.

In another embodiment, the system comprises several elements including but not limited to server machines, including at least processors and on-board non-transitory computer-readable media, among many other components, wherein these server machines are connected to a communications network 140 and may operate as an integrated backend server system 260.

It should be understood that, although certain specific embodiments have just been described, claimed subject matter is not intended to be limited in scope to any particular embodiment or implementation. For example, one embodiment may be in hardware, such as implemented on a device or combination of devices.

Likewise, although claimed subject matter is not limited in scope in this respect, one embodiment may comprise one or more articles, such as a storage medium or storage media that may have stored thereon instructions capable of being executed by a specific or special purpose system or apparatus, for example, to result in performance of an embodiment of a method in accordance with claimed subject matter, such as one of the embodiments previously described, for example.

However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random-access memory, dynamic random-access memory, flash memory, or a hard drive, although, again, claimed subject matter is not limited in scope to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details.

In other instances, features that would be under stood by one of ordinary skill were omitted or simplified so as not to obscure claimed subject matter. While certain features have been illustrated, or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A computer-implemented system configured to securely display one or more alternate degraded or obscured versions of captured Images to Users, each of the alternative Images having complementary or reciprocal degraded and clearly visible areas, and to enable purchase of one or more fully clear versions of the captured Images, comprising:
   one or more server machines, each server machine having a data connection to a communications network,
      wherein the server machines are in data communication over the communications network and operate as a backend server system,
      wherein the server machines further contain interconnected processors and non-transitory computer-readable media;
   at least one computer terminal, wherein the computer terminal is connected to the backend server system;
   a digital profile for each of one or more Users comprising a User account profile,
      wherein each User account profile contains one or more of test Images of the User and test Images of one or more persons of interest, and
      wherein the User account profiles are stored in one or more of the non-transitory computer-readable media; and
   a database comprising captured Images, wherein the database of captured Images is stored in one or more of the non-transitory computer-readable media, and
      wherein at least some of the one or more non-transitory computer-readable media have instructions loaded thereon that, when executed on one or more of the processors, perform the following steps, comprising:
         generating a digital profile for each User using information and test Images input by the User;
         uploading captured Images to the backend server system, and inputting captured Images into the database of captured Images;
         performing a facial recognition comparison search on the captured Images contained in the database of captured Images using one or more test Images contained in the User account profiles;
         detecting one or more faces of interest in one or more of the captured Images, based on one or more facial recognition matches between the faces in the test Images in the User account and the faces in the captured Images;
         calculating a set of facebox coordinates and respective locations for each of the one or more faces of interest detected in the captured Images;
         creating a first alternate Image for the captured Images including faces of interest having at least one obstruction covering each of the one or more faces of interest, wherein the size and placement of each respective obstruction are determined based on the facebox coordinates and respective locations for each face of interest;
         creating a second alternate Image for the captured Images including faces of interest having one or more areas of clear visibility showing each of the one or more faces of interest, with all surroundings other than the faces of interest obscured with one or more of degraded resolution and blur, wherein the second alternate Image is configured to include one or more clip paths that define each area of clear visibility and wherein the size and placement of each respective clip path are determined based on the facebox coordinates and respective locations for each face of interest;
         displaying on a screen of the computer terminal either one of the first and second alternate Images as a default Initial State Image;
         displaying on the screen of the computer terminal the other of the first and second alternate Images as a secondary Interaction State Image, upon interaction with the Initial State Image by the User;
         providing the User with an opportunity to purchase an unobstructed and unobscured, fully clear version of a selected captured Image including one or more faces of interest; and
         delivering one or more copies of the fully clear version of the selected captured Image to one or more User accounts belonging to Users that complete a purchase transaction.

2. The computer-implemented system of claim 1, wherein the instructions loaded on the non-transitory computer readable media, when executed by one or more of the processors, further perform the steps, comprising: selecting one or more faces to obstruct in the first alternate Image based on the facial recognition matches of a User's face included in a captured Image to one or more test Images found in the User account profile.

3. The computer-implemented system of claim 1, wherein the instructions loaded on the non-transitory computer readable media, when executed by one or more of the processors, further perform the steps, comprising: selecting one or more faces to obstruct in the first alternate Image based on an absolute size of a face, a size of a face relative to sizes of other faces in the captured Image, a number of pixels contained in a face, a closeness of a face to another face or a number of pixels between two faces, number of faces and identity of the faces.

4. The computer-implemented system of claim 1, wherein the first alternate Image has the obstructions integrated within and not separable from the first alternate Image, and wherein the second alternate Image has the degraded resolution or blur integrated within and not separable from the second alternate Image.

5. The computer-implemented system of claim 1, wherein creating the first and second alternate Images is implemented client side on the computer terminal using multiple layers of imagery, including:
   a client-side first alternate Image, including a first layer that is entirely and always blurred, a second layer that is entirely and always clearly visible, and a set of one or more blockade layers including one or more obstructions or blockades placed over each face of interest,
   wherein the blockades function to hide the faces of interest present within the second layer, and
   wherein only the second layer and the set of blockade layers are displayed in the first alternate Image, and a client-side second alternate Image, including the first layer that is entirely and always blurred, the second layer that is entirely and always clearly visible and a set of one or more invisible clip path layers including a defined clip path shape placed over each face of interest, wherein the one or more clip path shapes function to hide the second layer except for the faces of interest and overlay the clearly visible faces on top of the first layer, wherein the first layer, second layer and set of invisible clip path layers are displayed in the second alternate Image.

6. A computer-implemented system configured to securely display one or more alternate degraded or obscured versions of captured Images to Users, each of the alternative Images having complementary or reciprocal degraded and clearly visible areas, and to enable purchase of one or more fully clear versions of the captured Images, comprising:

one or more server machines, each server machine having a data connection to a communications network, wherein the server machines are in data communication over the communications network and operate as a backend server system, wherein the server machines further contain interconnected processors and non-transitory computer-readable media;

at least one computer terminal, wherein the computer terminal is connected to the backend server system;

a digital profile for each of one or more Users comprising a User account profile, wherein each User account profile contains one or more of test Images of one or more patterns of interest and test images of one or more objects of interest, and wherein the User account profiles are stored in one or more of the non-transitory computer-readable media; and a database comprising captured Images, wherein the database of captured Images is stored in one or more of the non-transitory computer-readable media, and wherein at least some of the one or more non-transitory computer-readable media have instructions loaded thereon that, when executed on one or more of the processors, perform the following steps, comprising:

generating a digital profile for each User using information and test Images input by the User;

uploading captured Images to the backend server system, and inputting captured Images into the database of captured Images;

performing a facial recognition comparison search on the captured Images contained in the database of captured Images using one or more test Images contained in the User account profiles;

detecting one or more of patterns and objects of interest in one or more of the captured Images, based on one or more pattern and object recognition matches between the patters and objects in the test Images in the User account and the patterns and objects in the captured Images;

calculating a set of coordinates comprising a coordinate box and respective locations for each of the one or more patterns and objects of interest detected in the captured Images;

creating a first alternate Image for each captured Image including patterns and objects of interest having at least one obstruction covering each of the one or more patterns and objects of interest, wherein the size and placement of each respective obstruction are determined based on the coordinate box coordinates and respective locations for each pattern and object of interest;

creating a second alternate Image for the captured Images including patterns and objects of interest having one or more areas of clear visibility showing each of the one or more patterns and objects of interest, with all surroundings other than the patterns and objects of interest obscured with one or more of degraded resolution and blur, wherein the second alternate Image is configured to include one or more clip paths that define each area of clear visibility and wherein the size and placement of each respective clip path are determined based on the coordinate box coordinates and respective locations for each pattern and object of interest;

displaying on a screen of the computer terminal either one of the first and second alternate Images as a default Initial State Image;

displaying on the screen of the computer terminal the other of the first and second alternate Images as a secondary Interaction State Image, upon interaction with the Initial State Image by the User;

providing the User with an opportunity to purchase an unobstructed and unobscured, fully clear version of a selected captured Image including one or more patterns and objects of interest; and delivering one or more copies of the fully clear version of the selected captured Image to one or more User accounts belonging to Users that complete a purchase transaction.

7. The computer-implemented system of claim 6, wherein the instructions loaded on the non-transitory computer readable media, when executed by one or more of the processors, further perform the steps, comprising: selecting one or more patterns and objects to obstruct in the first alternate Image based on pattern or object recognition matches of a pattern or object included in one or more captured Images to patterns and objects included in one or more test Images found in the User account profile.

8. The computer-implemented system of claim 6, wherein the instructions loaded on the non-transitory computer readable media, when executed by one or more of the processors, further perform the steps, comprising: selecting one or more patterns and objects to obstruct in the first alternate Image based on an absolute size of a pattern or object, a size of a pattern or object relative to other patterns or objects in the captured Images, a number of pixels contained in the patterns or objects, a closeness of a pattern or object to another pattern or object, a number of pixels between patterns or objects, a number of patterns and objects and an identity of the patterns and objects.

9. The computer-implemented system of claim 6, wherein the first alternate Image has the obstructions integrated within and not separable from the first alternate Image, and wherein the second alternate Image has the degraded resolution or blur integrated within and not separable from the second alternate Image.

10. The computer-implemented system of claim 6, wherein creating the first and second alternate Images is implemented client side on the computer terminal using multiple layers of imagery, including a first alternate Image, including a first layer that is entirely and always blurred, a second layer that is entirely and always clearly visible, and a set of one or more blockade layers including one or more obstructions or blockades placed over each face of interest, wherein the blockades function to hide the faces of interest present within the second layer, and wherein only the second layer and the set of blockade layers are displayed in the first alternate Image, and a second alternate Image, including the first layer that is entirely and always blurred, the second layer that is entirely and always clearly visible and a set of one or more invisible clip path layers including a defined clip path shape placed over each face of interest, wherein the one or more clip path shapes function to hide the second layer except for the faces of interest and overlay the clearly visible faces on top of the first layer, wherein the first layer, second layer and set of invisible clip path layers are displayed in the second alternate Image.

* * * * *